United States Patent
Ukon et al.

(10) Patent No.: US 11,916,763 B2
(45) Date of Patent: Feb. 27, 2024

(54) TRAFFIC MONITORING DEVICE, AND TRAFFIC MONITORING METHOD

(71) Applicant: Nippon Telegraph and Telephone Corporation, Tokyo (JP)

(72) Inventors: Yuta Ukon, Tokyo (JP); Shuhei Yoshida, Tokyo (JP); Shoko Oteru, Tokyo (JP); Namiko Ikeda, Tokyo (JP); Koyo Nitta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 178 days.

(21) Appl. No.: 17/620,815

(22) PCT Filed: Jul. 1, 2019

(86) PCT No.: PCT/JP2019/026082
§ 371 (c)(1),
(2) Date: Dec. 20, 2021

(87) PCT Pub. No.: WO2021/001879
PCT Pub. Date: Jan. 7, 2021

(65) Prior Publication Data
US 2022/0417118 A1     Dec. 29, 2022

(51) Int. Cl.
*H04L 43/026*     (2022.01)
*H04L 45/7453*     (2022.01)

(52) U.S. Cl.
CPC ........ *H04L 43/026* (2013.01); *H04L 45/7453* (2013.01)

(58) Field of Classification Search
CPC .......... H04L 43/026; H04L 45/7453
USPC ....................... 709/224
See application file for complete search history.

(56) References Cited

U.S. PATENT DOCUMENTS

| | | | | |
|---|---|---|---|---|
| 2005/0276230 A1* | 12/2005 | Akahane | ............ | H04L 43/00 370/252 |
| 2010/0034109 A1* | 2/2010 | Shomura | ............ | H04L 41/142 370/252 |
| 2018/0089259 A1* | 3/2018 | James | ............ | G06F 16/2425 |
| 2020/0050607 A1* | 2/2020 | Pal | ............ | G06F 16/24549 |

FOREIGN PATENT DOCUMENTS

| | | |
|---|---|---|
| JP | 2006005402 A | 1/2006 |
| JP | 2010041471 A | 2/2010 |

* cited by examiner

*Primary Examiner* — Hermon Asres
(74) *Attorney, Agent, or Firm* — Slater Matsil, LLP

(57) ABSTRACT

A traffic monitoring apparatus includes: a header analysis circuit configured to acquire one or more identifiers from a header of a received packet; a rule registration circuit configured to convert a rule table including rules in which one or more rule elements are registered for each of the rules into a predetermined format and register the rule table in a rule matching circuit; and the rule matching circuit configured to search for rules to be matched with the acquired identifiers.

8 Claims, 16 Drawing Sheets

| | RULE NUMBER (51) | TRANSMISSION SOURCE IP (src IP) (52A) | DESTINATION IP (dst IP) (52B) | DESTINATION PORT NUMBER (dst Port) (52C) |
|---|---|---|---|---|
| 51A | 0 | src IP 0 | dst IP 0 | dst Port 1 |
| 51B | 1 | src IP 1 | * | dst Port 0 |
| 51C | 2 | * | dst IP 1 | dst Port 1 |
| 51D | 3 | src IP 0 | * | * |

Fig. 5

TRAFFIC MONITORING DEVICE, AND TRAFFIC MONITORING METHOD

CROSS-REFERENCE TO RELATED APPLICATIONS

This application is a national phase entry of PCT Application No. PCT/JP2019/026082, filed on Jul. 1, 2019, which application is hereby incorporated herein by reference.

TECHNICAL FIELD

The present invention relates to an apparatus for monitoring network traffic and a method for monitoring network traffic.

BACKGROUND

In carrier networks or data centers, network traffic (hereinafter, traffic) is monitored to manage and run services. In recent years, traffic has become more diversified due to advances in network virtualization using a software defined network (SDN) or network function virtualization (NFV), and traffic monitoring apparatuses for monitoring a variety of traffic have been required.

According to the traffic analysis technique proposed in Patent Literature 1, rule matching is performed on one or more identifiers (IP addresses or port numbers, for example) acquired from a header of a received packet, and the number of packets and the number of bytes are counted for each rule. Such a technique of creating statistical data from received packets is effective for monitoring traffic in real time.

The traffic monitoring apparatus described in Patent Literature 2 includes a plurality of rule tables and performs rule matching and statistical analysis for each table. With this configuration, it is possible to acquire a plurality of pieces of statistical data at the same time and thereby to achieve advanced monitoring of traffic through comprehensive analysis of the data.

CITATION LIST

Patent Literature

Patent Literature 1: JP 2006-005402 A;
Patent Literature 2: JP 2010-041471 A.

SUMMARY

Technical Problem

According to the technique described in Patent Literature 2, a plurality of pieces of statistical data are acquired at the same time by performing rule matching and statistical analysis for each rule table. However, this technique requires a rule table for each of search conditions.

In a case in which three kinds of identifiers are combined and defined as search conditions, for example, 8 (=2 to the power of 3) rule tables are required to realize all combinations. Because the number of required rule tables exponentially increases as the number of identifiers used as search conditions increases, it is difficult to implement all the combinations with limited memory resources in a case in which search conditions of a combination of a large number of identifiers are required.

Embodiments of the present invention were made to solve the aforementioned problem, and an object thereof is to provide a traffic monitoring apparatus configured to perform rule matching that covers search conditions with fewer rule tables.

Means for Solving the Problem

A traffic monitoring apparatus according to embodiments of the present invention includes: a header analysis unit configured to acquire one or more identifiers from a header of a received packet; a rule registration unit configured to convert a rule table including rules in which one or more rule elements are registered for each of the rules into a predetermined format and register the rule table in a rule matching unit; and the rule matching unit configured to search for the rules to be matched with the acquired identifiers, in which the rule matching unit includes one or more rule matching functional units provided for each of the rule elements and configured to output values indicating the rules to be matched with the acquired identifiers, and a logical AND calculation unit configured to calculate a logical AND of the values output from the rule matching functional units, and each of the rule matching functional units includes a hash arithmetic operation unit configured to calculate hash values of the acquired identifiers, a hash table configured to hold values representing the rules to be matched with the identifiers for each of the hash values of the identifiers of the rule elements, a wild card storage unit configured to hold values representing the rules for which wild cards have been set, for each of the rule elements, and a logical OR calculation unit configured to calculate a logical OR of values in the hash table corresponding to the hash values and values of the corresponding rule elements in the wild card storage unit.

A traffic monitoring method according to embodiments of the present invention includes: converting a rule table including rules in which one or more rule elements are registered for each of the rules into a predetermined format and registering the rule table; acquiring one or more identifiers from a header of a received packet; and searching for the rules to be matched with the acquired identifiers, in which the searching for the rules to be matched includes a step of outputting values representing the rules to be matched with the acquired identifiers, which is executed for each of the rule elements, the step including calculating hash values of the acquired identifiers, searching for a hash table that holds values representing the rules to be matched with the identifiers for each of hash values of identifiers of the rule elements, using the hash values of the acquired identifiers as inputs, and calculating, for each of the rule elements, a logical OR of wild card information constituted by a value output from the hash table and a value representing the rule for which a wild card has been set in a corresponding one of the rule elements, and a step of calculating a logical AND of the logical OR calculated for each of the rule elements.

Effects of Embodiments of the Invention

According to embodiments of the present invention, it is possible to provide a traffic monitoring apparatus configured to perform rule matching that covers search conditions with fewer rule tables.

BRIEF DESCRIPTION OF THE DRAWINGS

FIG. 5 is a diagram for explaining an example of a rule table used by a rule registration unit.

DETAILED DESCRIPTION OF ILLUSTRATIVE EMBODIMENTS

Hereinafter, an embodiment of the present invention will be described in detail based on the drawings.

Figure 1:
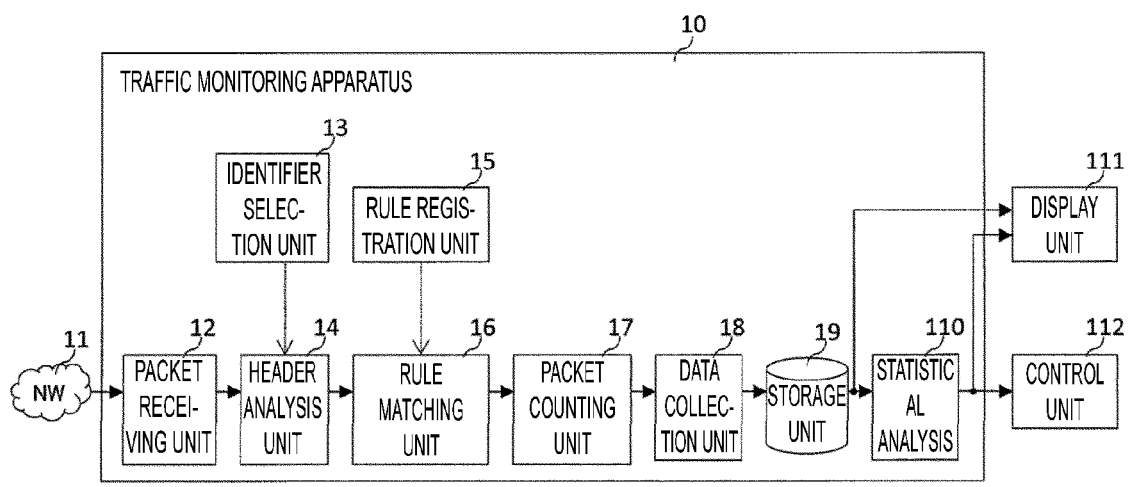
FIG. 1 is a block diagram illustrating a configuration of a traffic monitoring apparatus.

FIG. 1 is a diagram illustrating a configuration of a traffic monitoring apparatus 10 according to an embodiment of the present invention. The traffic monitoring apparatus 10 includes a packet receiving unit 12, an identifier selection unit 13, a header analysis unit 14, a rule registration unit 15, a rule matching unit 16, a packet counting unit 17, a data collection unit 18, a storage unit 19, and a statistical analysis unit 110. In the traffic monitoring apparatus 10, packets arrived via a network (NW) 11 are received in the packet receiving unit 12 and are transferred to the header analysis unit 14.

The header analysis unit 14 extracts one or more identifiers from a header of a packet. Information used as the identifiers includes, for example, media access control (MAC) addresses, protocols, Internet protocol (IP) addresses, and port numbers, and in particular, combinations (5-tuple) of transmission source IP addresses, destination IP addresses, transmission source port numbers, destination port numbers, and protocols are often used. Also, identifiers such as VLAN IDs or VXLAN IDs may be used in virtual networks.

Because a plurality of identifiers are present in this manner, it is desirable that identifiers be able to be selected in accordance with features of a network or traffic that is desired to be monitored. Thus, a user selects identifiers to be used for analysis and registers the identifiers in the identifier selection unit 13, such that the header analysis unit 14 can change identifiers to be extracted in the present embodiment.

The rule matching unit 16 searches for rules to be matched with identifiers input from a rule table through comparison of rules registered in the rule table in the rule registration unit 15 with the input identifiers. The rules registered in the rule tables in the rule registration unit 15 are converted into a format in which the rule matching unit 16 can use the rules, are registered in the rule matching unit 16, and are compared with the input identifiers.

The rule table is a table in which one or a plurality of rules defined by the user are registered, rule elements constituted by one or more identifiers are registered for each rule, and the rule elements may include wild cards that do not specify identifiers. In a case of a rule table including wild cards, one identifier may correspond to two or more rules, and in such a case, all the rules to be matched are output as matching results. Details of the rule table will be given later.

The packet counting unit 17 counts the number of packets and the number of bytes for each rule based on the matching result. The values of the counted numbers of packets and bytes are periodically collected by the data collection unit 18 and are transferred to and stored in the storage unit 19.

It is possible to obtain statistical data from the received packet through the aforementioned operations. The statistical data is sent to the statistical analysis unit no, and processing such as threshold value determination and deviation value detection is performed. Note that it is possible to shorten the time required until detection of traffic abnormality after occurrence thereof by shortening the collection cycle time of the statistical data performed by the data collection unit 18.

The detected abnormality is used for monitoring and traffic control by the display unit in and the control unit 112. As illustrated in FIG. 1, a data path of sending information in the storage unit 19 directly to the display unit 111 is also conceivable.

As a configuration for realizing such a traffic monitoring apparatus 10, a configuration achieved by combining a general server and a field-programmable gate array (FPGA) accelerator, for example, is conceivable. Since it is possible to increase the speed of packet processing using an FPGA accelerator, such a configuration is effective for traffic monitoring in a high-speed network such as a 40G or 100G network. On the other hand, because high-speed packet processing is not needed in a low-speed network, a configuration of a server alone in which all the processes are implemented as software is conceivable.

Figure 2:
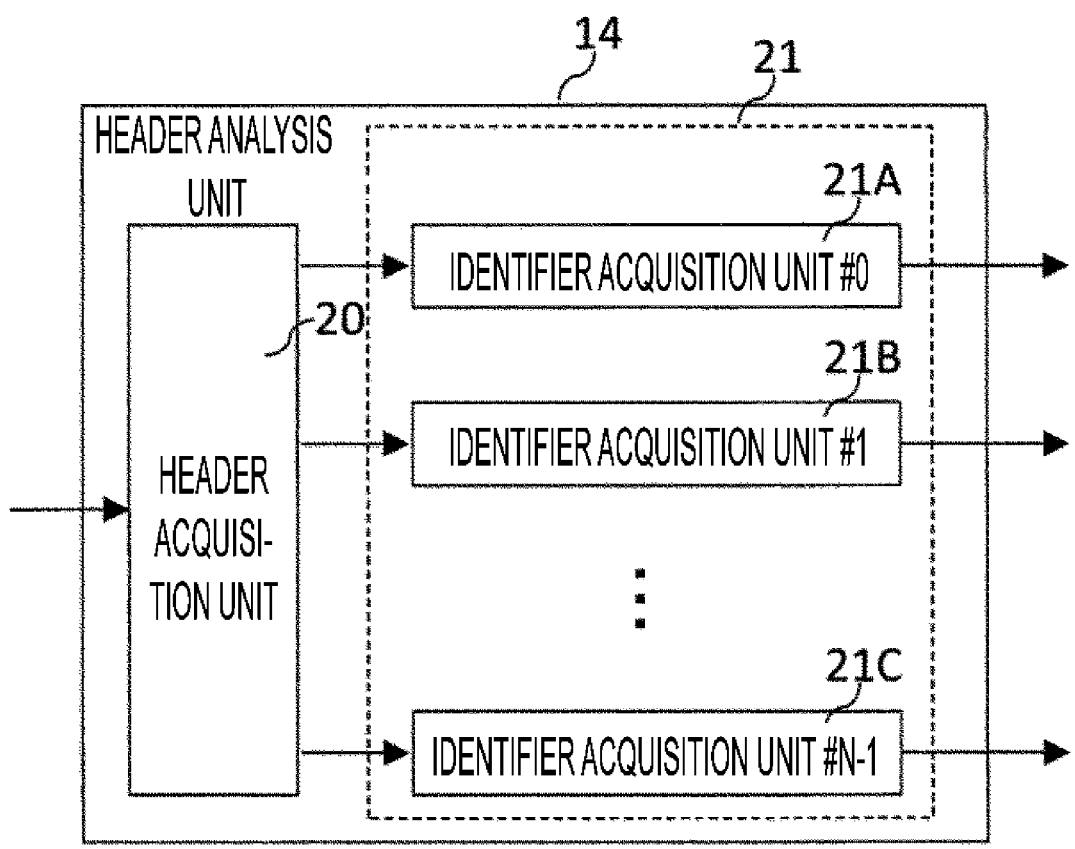
FIG. 2 is a block diagram illustrating a configuration of a header analysis unit.

FIG. 2 illustrates a block diagram of the header analysis unit 14 included in the traffic monitoring apparatus 10. The header analysis unit 14 is configured using a header acquisition unit 20 and one or more identifier acquisition units 21 (21A to 21C).

Figure 3:
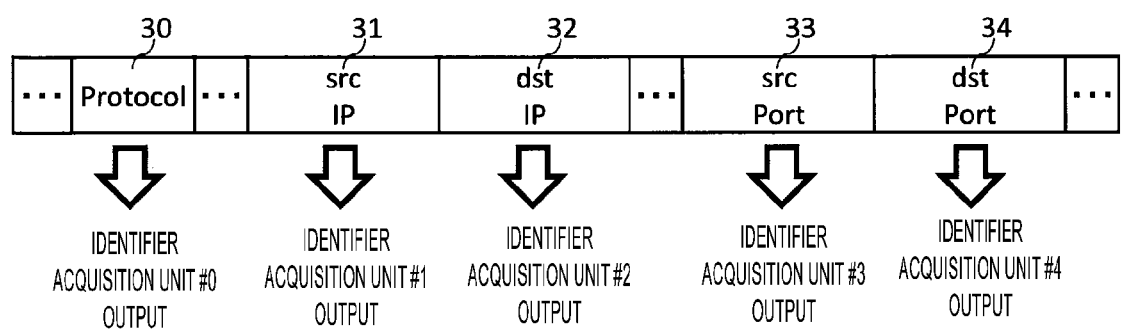
FIG. 3 is a diagram for explaining an example in which identifiers (5-tuple) are extracted from a received packet.

The header acquisition unit 20 separates a packet into a header and a payload and sends the acquired header to the identifier acquisition units 21. The identifier acquisition units 21 extract identifiers designated by the identifier selection unit 13 from the header and transfer the identifiers to the following stage. FIG. 3 is an example in which five identifiers (5-tuple) are extracted.

In FIG. 3, five identifier acquisition units #1 to #4 output a protocol 30, a transmission source IP address (src IP) 31, a destination IP address (dst IP) 32, a transmission source port number (src Port) 33, and a destination port number (dst Port) 34, respectively. The extracted identifiers can be changed by the identifier selection unit 13.

Figure 4:
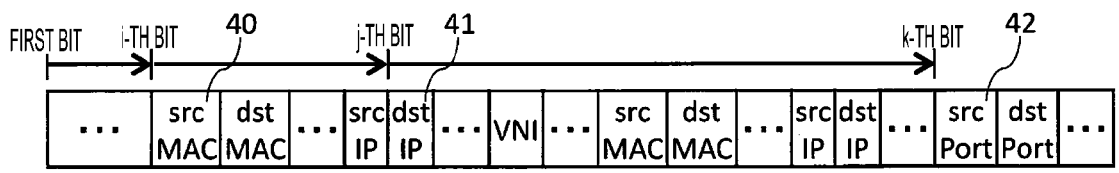
FIG. 4 is a diagram for explaining an example in which arbitrary identifiers are extracted from a received packet.

FIG. 4 is an example of a method for setting identifiers to be extracted. Since each identifier generally has a certain size, it is possible to find identifiers to be acquired by counting the bit number from the head of the header. The example in FIG. 4 illustrates a header of a packet flowing in a VXLAN which is one of virtual networks. An external destination MAC address (src MAC) 40 starts from the i-th bit, an external destination IP address (dst IP) 41 starts from the j-th bit, and a transmission source port number (src Port) 42 starts from the k-th bit. In this case, it is possible to extract these identifiers by providing a notification regarding the values of i, j, and k and the sizes of the identifiers to the identifier acquisition unit.

FIG. 5 illustrates an example of a rule table 50 used by the rule registration unit 15. The rule table 50 is a table in which rules defined by the user are registered and is configured with a rule number 51 and rule elements 52A to 52C. The number and types of rule elements can be changed without exceeding the number of identifier acquisition units 21. In that case, it is necessary to change the setting of the identifier acquisition unit 21 as well.

In the rule table 50 used in the present embodiment, it is possible to use a wild card "*" meaning "DO NOT CARE" for arbitrary rule elements. The wild card is effective for flexible traffic monitoring, and for example, it is possible to perform traffic monitoring focusing on transmission sources in accordance with the rules of the rule numbers 51B and 51D and to perform traffic monitoring focusing on destinations in accordance with the rule of the rule number 51C.

Figure 6:
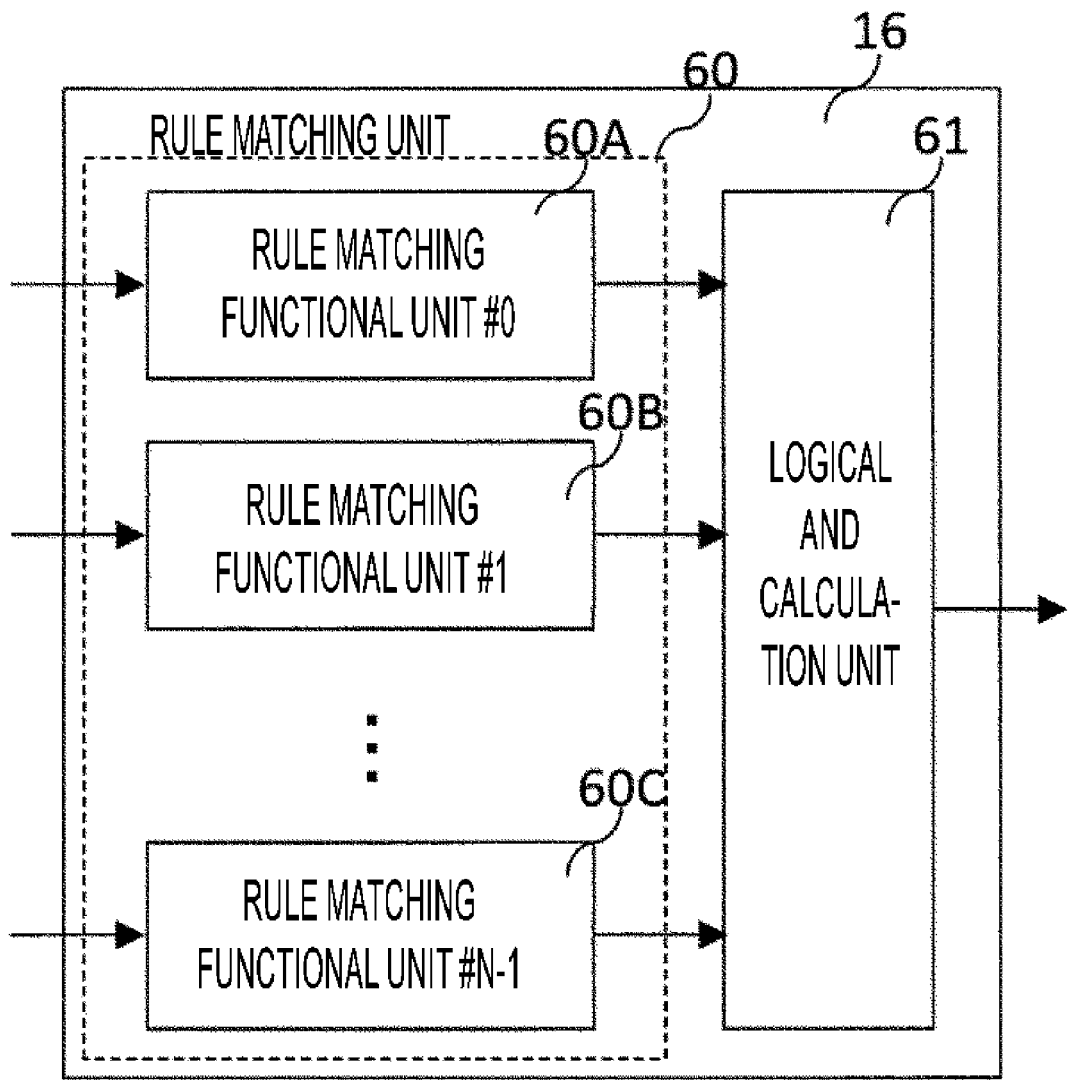
FIG. 6 is a block diagram illustrating a configuration of a rule matching unit.
Figure 7:
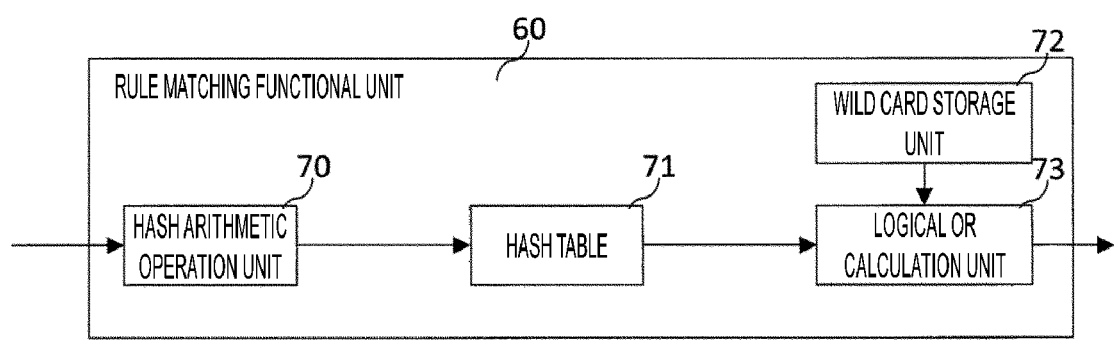
FIG. 7 is a block diagram illustrating a configuration of a rule matching functional unit.

FIG. 6 illustrates a block diagram of the rule matching unit 16 included in the traffic monitoring apparatus 10. The rule matching unit 16 is configured with one or more rule matching functional units 60A to 60C and a logical AND calculation unit 61. Also, each rule matching functional unit 60 is configured with a hash arithmetic operation unit 70, a hash table 71, a wild card storage unit 72, and a logical OR calculation unit 73 as illustrated in FIG. 7.

Figure 9:
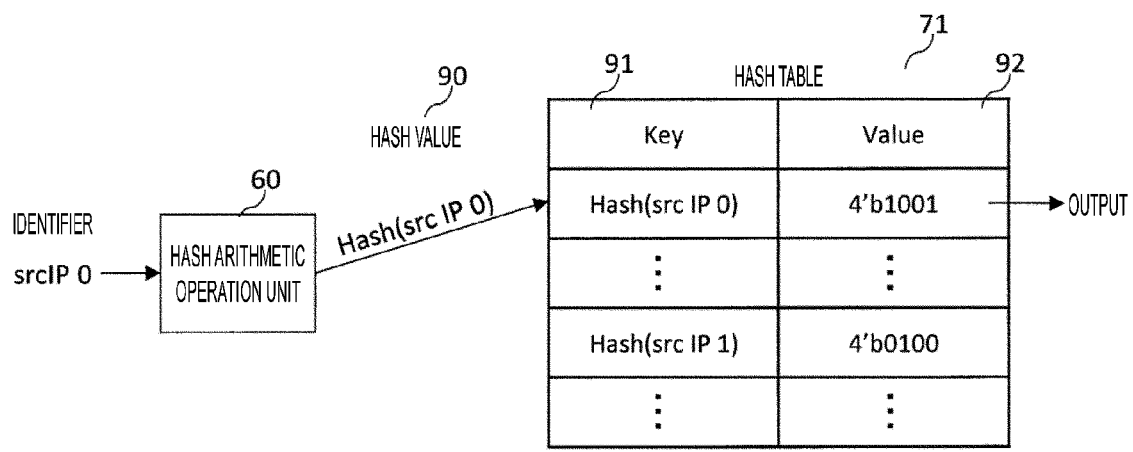
FIG. 9 is a diagram for explaining operations of a hash table.

Operations of the hash table 71 in each rule matching functional unit 60 will be described using FIG. 9. As illustrated in FIG. 9, a corresponding value is registered for each of hash values of the identifiers of the rule elements in the hash table 71. First, the identifiers input to the rule matching functional unit 60 are input to the hash arithmetic operation unit 70, and calculated hash values 90 are output. The hash values 90 are used as keys 91 in the hash table 71, and corresponding values 92 are output. Values calculated by the rule registration unit 15 are held in the values 92, and bit sequences in which rows in the rule table that conform to the input identifiers are represented by 1 and the other rows are represented by 0 are output.

In a case in which the rule table 50 in FIG. 5 is used, for example, and if an input identifier is "src IP0", then "1001" is output from the hash table 71. The output bit sequence means that the input identifier conforms to the rule number 51A and the rule number 51D in the rule table 50. Thus, the length of the bit sequence is proportional to the number of rows in the rule table 50.

The hash table 71 generally requires a large memory space relative to the number of rules to be registered. This is because it is necessary to prepare a memory space within a range that can cover the hash values 90 even if the number of rules is small. For this reason, utilization efficiency of the memory resources in the hash table 71 illustrated in FIG. 9 is low because the bit sequences are stored directly in the values 92.

Figure 8:
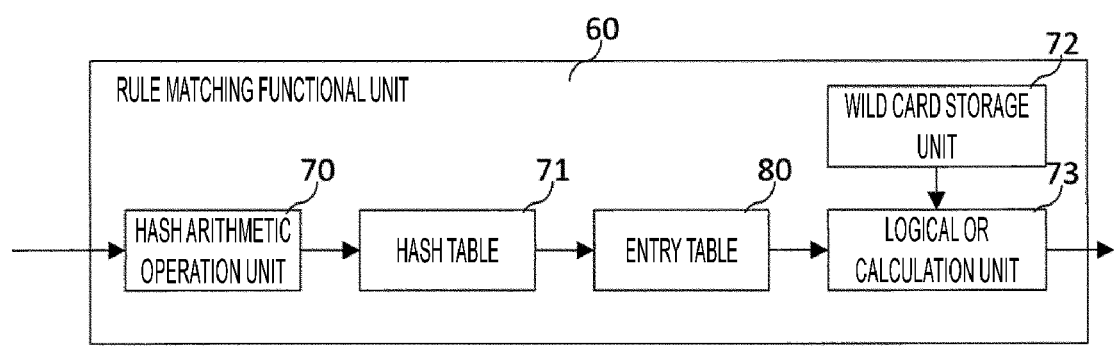
FIG. 8 is a block diagram illustrating another configuration of the rule matching functional unit.
Figure 10:
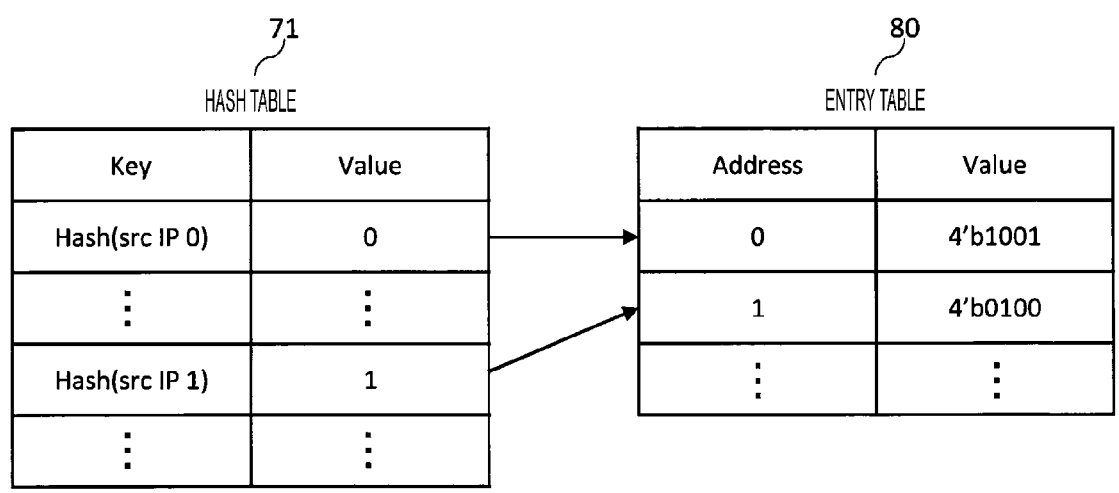
FIG. 10 is a diagram for explaining operations in a case in which the hash table is combined with an entry table.

Thus, a method of storing addresses of entry tables 80 (second tables) corresponding to the hash tables 71 (first tables) and storing a bit sequence for each of addresses of the entry tables 80 as illustrated in FIG. 10 is conceivable. Since the entry table 80 can efficiently store the bit sequences although the amount of information to be used for searching increases due to the increase in number of tables to two, it is possible to create the entry tables 80 with necessary limited memory resources. FIG. 8 is a configuration of the rule matching functional unit in a case in which the hash table is configured with a hash table and an entry table.

Also, since each address is smaller than each bit sequence, it is possible to reduce the amount of unnecessary memory resources in the hash table 71, and as a result, it is possible to reduce the amount of memory resources used in the entire table.

Figure 11:
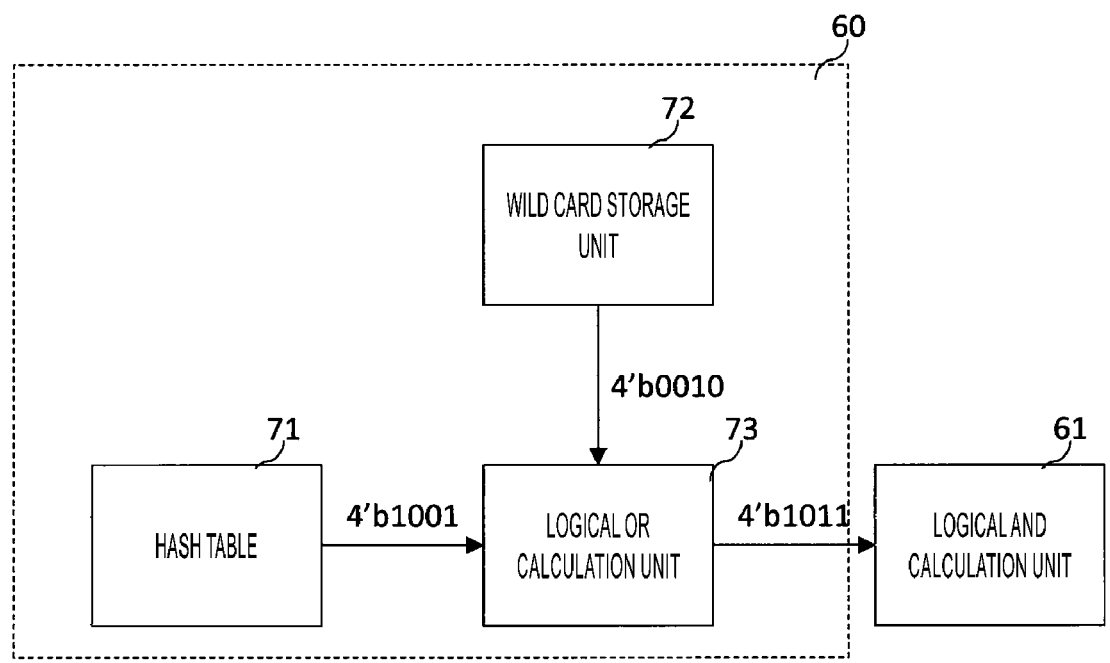
FIG. 11 is a diagram for explaining operations of a logical OR calculation unit.

A method for obtaining a matching result in consideration of the wild card for one input identifier will be described using FIG. 11. As described above in FIG. 9, the hash table 71 or the entry table 80 is configured to output a bit sequence in which rows in the rule table that conform to the input identifier are represented by 1 and the other rows are represented by 0.

On the other hand, the wild card storage unit 72 is configured to output a bit sequence in which rows in the rule table with a wild card designated are represented by 1 and the other rows are represented by 0. In a case in which the rule table 50 in FIG. 5 is used, for example, the wild card is used in the row of the rule number 52C in the column of the rule element 52A, and the bit sequence held and output by the wild card storage unit 72 is "0010".

A logical OR of such bit sequences is calculated for each bit by the logical OR calculation unit 73. In the example in FIG. 11, the output of the logical OR calculation unit 73 is "1011". This means that the input identifier conforms to the rule numbers 51A, 51C, and 51D in the rule table 50, and the wild card information is reflected thereto.

Figure 12:
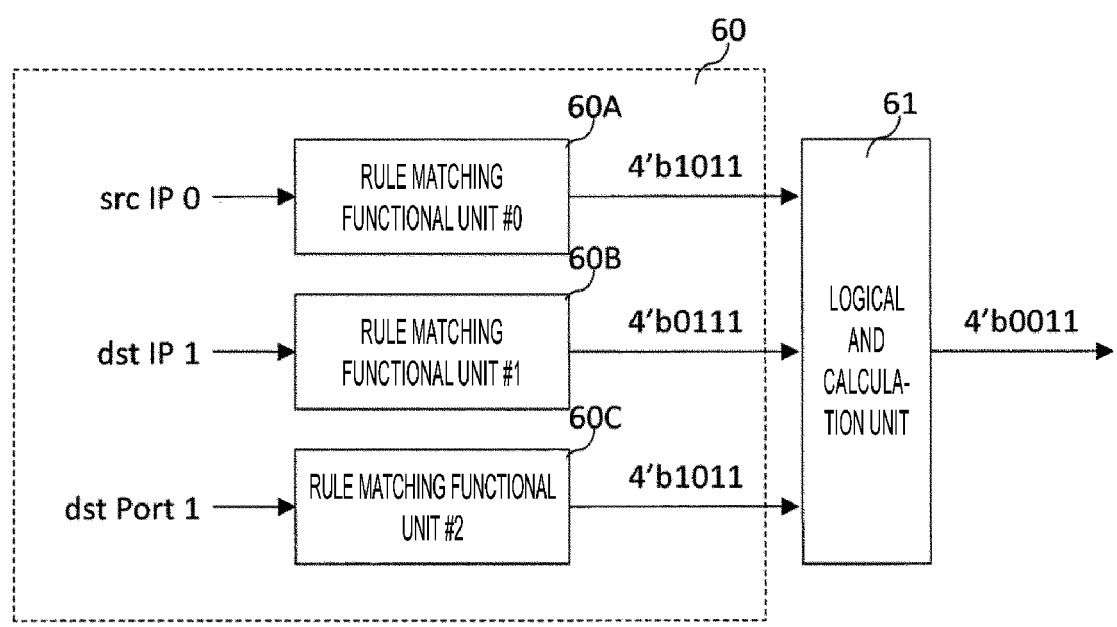
FIG. 12 is a diagram for explaining an operation example of the rule matching unit.

FIG. 12 illustrates an operation example in a case in which the rule table 50 in FIG. 5 is used and illustrates a method for obtaining a matching result for the entire rule table 50. When input identifiers are assumed to be "src IP0", "dst IP1", and "dst Port1", the rule matching functional unit 60A to 60C output bit sequences "1011", "0111", and "1011", respectively by the aforementioned method.

"0011" which is an output of the rule matching unit 16 is obtained by calculating the logical AND from these bit sequences for each bit by the logical AND calculation unit 61. This bit sequence is a matching result, in which only the rows that conform to all the rule elements 52A to 52C in the rule table 50 are represented by 1, which includes all the corresponding rules. The output "0011" of the rule matching unit 16 represents that the received packet matches the rule number 2 (51C) and the rule number 3 (51D) in the rule table 50.

Figure 13:
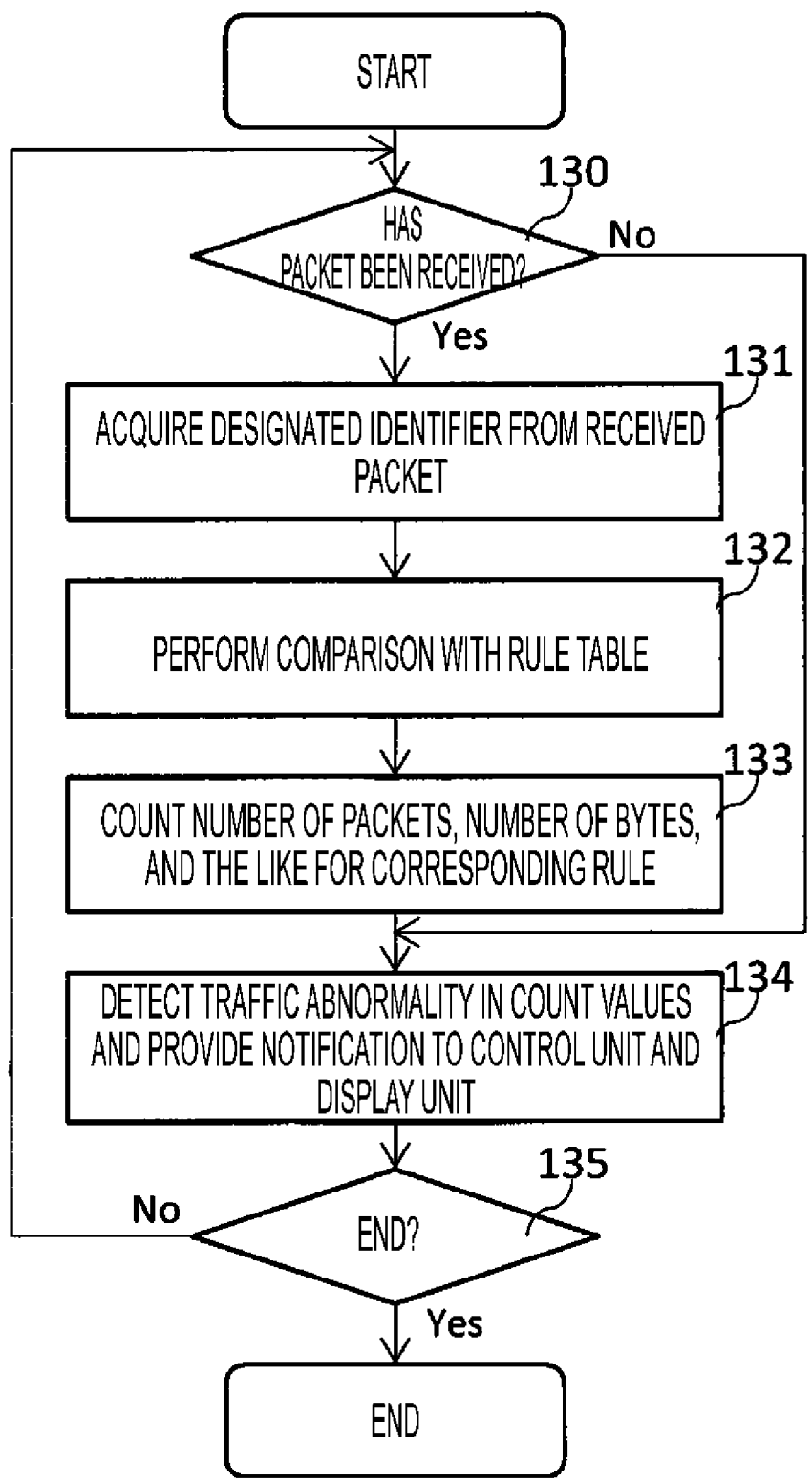
FIG. 13 is a flowchart for explaining operation steps of the traffic monitoring apparatus.

Next, overall processing steps of the traffic monitoring method performed by the traffic monitoring apparatus 10 will be described using FIG. 13. The traffic monitoring apparatus 10 waits for reception of a packet while performing traffic monitoring as needed (Step 130). If a packet arrives, then a header analysis step is executed first, and a designated identifier is acquired (Step 131).

Then, a rule matching step of comparing the identifier with the rule table is executed by the aforementioned method, and a corresponding rule is searched for (Step 132). Then, the number of packets and number of bytes are counted for each corresponding rule based on the matching result of the rule matching step (Step 133).

Figure 16:
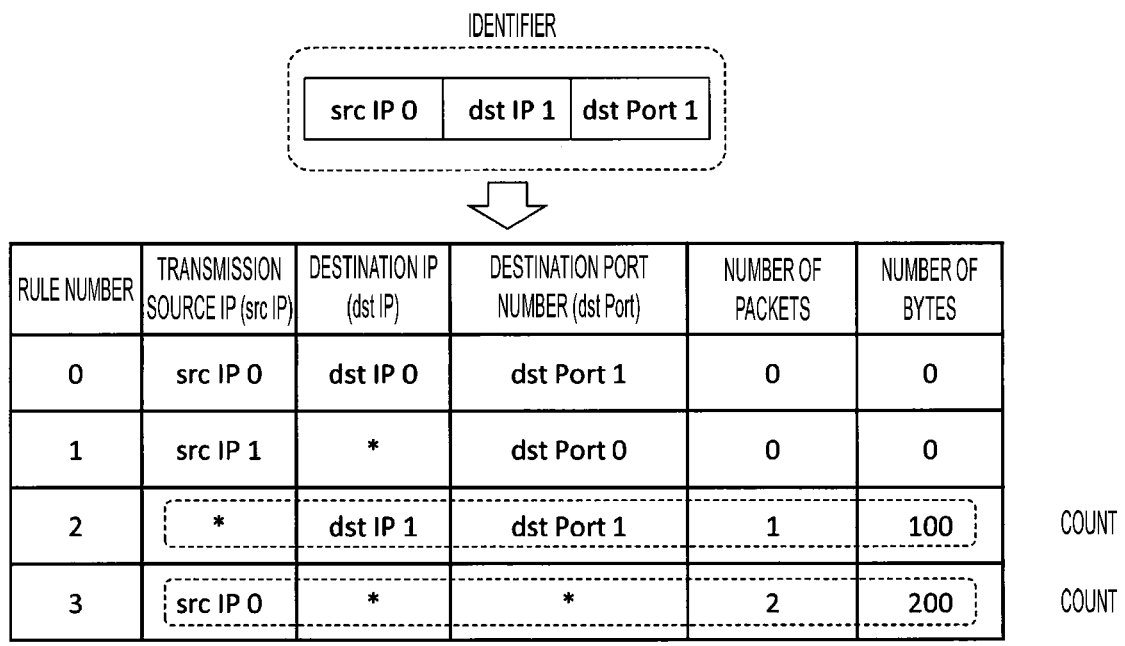
FIG. 16 is a diagram illustrating an example in which the traffic monitoring apparatus counts the number of packets and the number of bytes.

FIG. 16 is an example of a case in which the number of packets and the number of bytes when the rule table 50 in FIG. 5 is used are counted. In FIG. 16, "src IP0", "dst IP1", and "dst Port1" have been designated as identifiers to be acquired, and a result of counting the number of packets and the number of bytes that match the rule number 2 (51C) and the rule number 3 (51D) in the rule table 50 in FIG. 5 is recorded. Note that although both the number of packets and the number of bytes are recorded in FIG. 16, either the number of packets or the number of bytes may be recorded.

Finally, traffic abnormality is detected using a method such as deviation value detection from the counted values, and a notification thereof is provided to the control unit and the display unit (Step 134). Thereafter, if there is no command to stop the operations, the processing returns to Step 130. It is possible to collect aggregated data and to detect traffic abnormality through the aforementioned operations.

Figure 14:
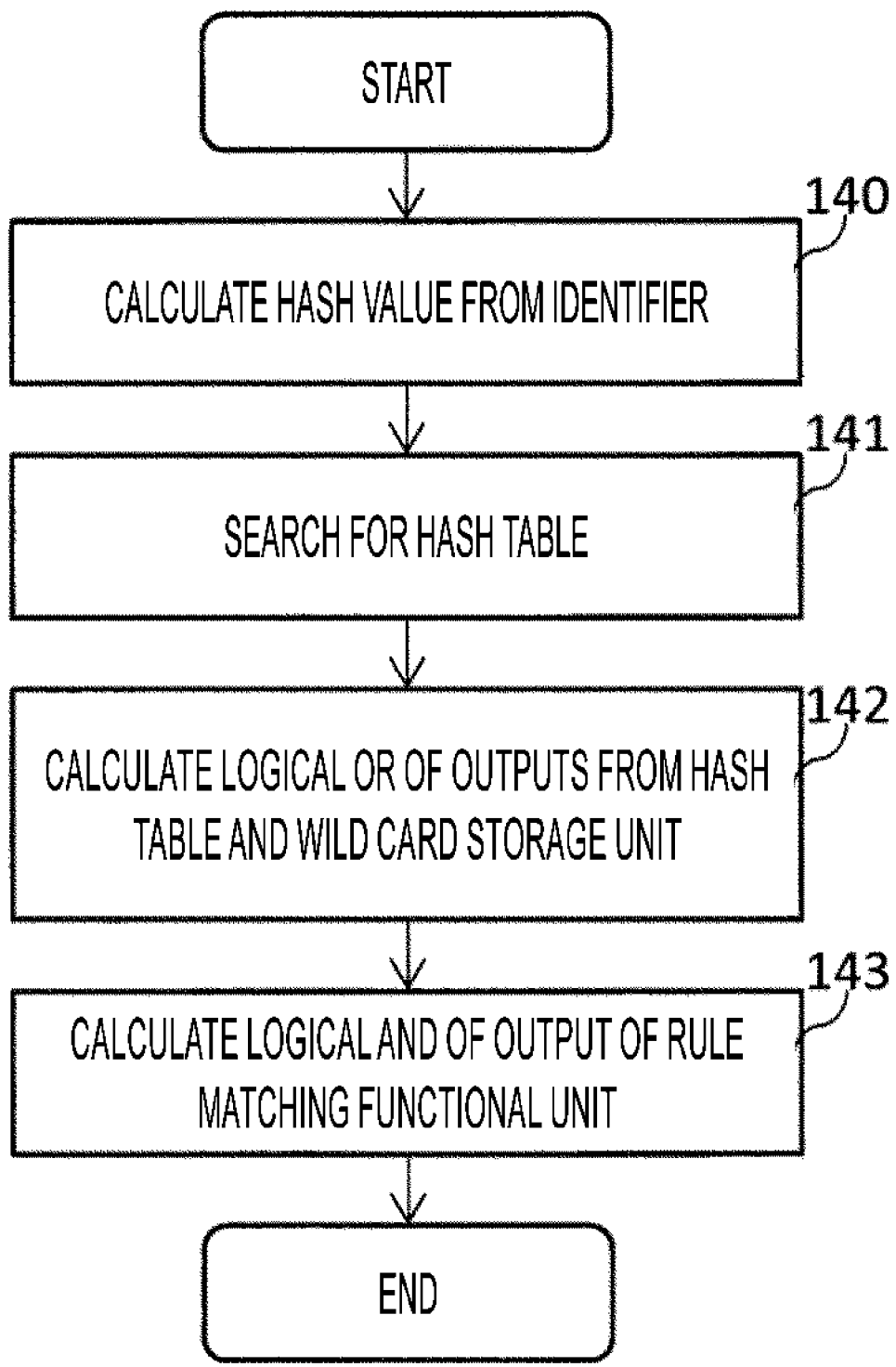
FIG. 14 is a flowchart for explaining operation steps of the rule matching unit.

The rule matching step performed by the rule matching unit 16 will be described using FIG. 14. If the header analysis unit 14 acquires one or more identifiers, then the rule matching unit 16 calculates the hash value 90 of each identifier first (Step 140). Then, the rule matching unit 16 searches for a hash table using the obtained hash value and acquires a bit sequence (Step 141).

The rule matching unit 16 calculates a logical OR of the bit sequence and a bit sequence in the wild card storage unit (Step 142) and further calculates a logical AND of outputs of such logical ORs (Step 143). It is possible to perform rule matching on the rule table including the wild card through the aforementioned operations.

Figure 15:
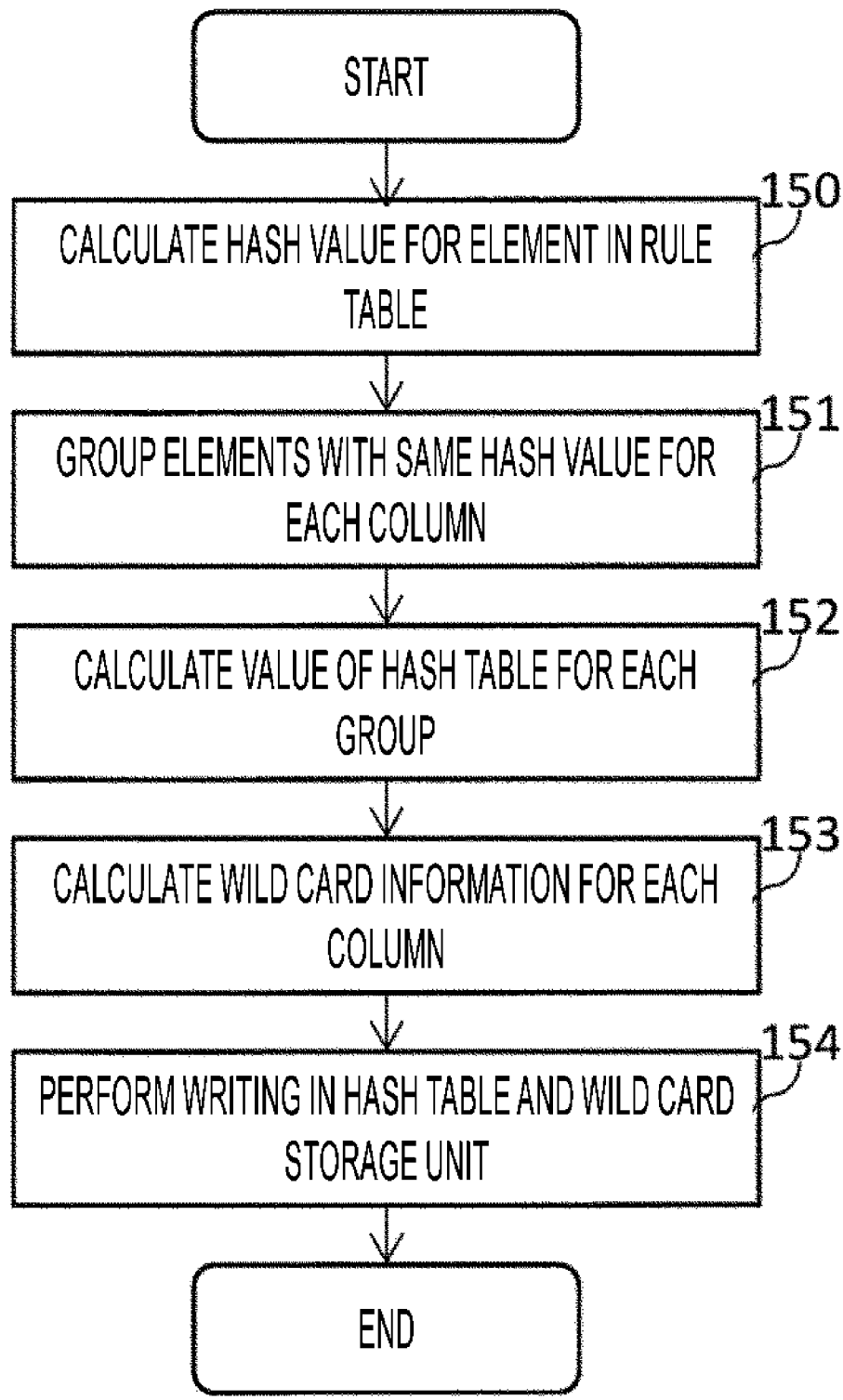
FIG. 15 is a flowchart for explaining a step of calculating data to be written in the hash table and a wild card storage unit from the rule table.

The rule registration step in which the rule registration unit 15 writes a bit sequence in the hash table 71 and the wild card storage unit 72 of the rule matching functional unit 60 will be described using FIG. 15. If the rule table 50 is provided by the user, the hash value 90 is calculated first using the same algorithm as that of the hash arithmetic operation unit 70 on the identifier of each rule element configuring the rule table 50 (Step 150).

Then, elements with the same hash value 90 are grouped for each column in the rule table 50, that is, for each rule element (Step 151). A bit sequence in which corresponding rows in the rule table 50 are represented by 1 and the other rows are represented by 0 is calculated for each group (Step 152). Next, a bit sequence in which rows with wild cards described therein are represented by 1 and rows with something else described therein are represented by 0 is calculated for each column in the rule table 50 (Step 153).

Finally, these bit sequences are written in the hash table 71 and the wild card storage unit 72 (Step 154). It is possible to convert the rule table 50 into a predetermined format and to register the rule table in each rule matching functional unit 60 of the rule matching unit 16 through the aforementioned steps.

As described above, according to the present embodiment, rule matching is performed for each column in the rule table, and a bit sequence in which table rows that conform to the input or rows with wild card designated therein are represented by 1 and the other rows are represented by 0 is then output when matching between an identifier that is a target of searching and the rule table is performed. The logical AND of the thus obtained bit sequences is calculated, such that a result of the rule matching for the entire rule table can be obtained. Such a configuration enables rule matching that covers search conditions with the same number of hash tables as the number of identifiers that are targets of searching, and a technique for performing rule matching that covers search conditions with fewer rule tables as compared with that in the related art is thus provided.

REFERENCE SIGNS LIST

10 Traffic monitoring apparatus
11 Network (NW)
12 Packet receiving unit
13 Identifier selection unit
14 Header analysis unit
15 Rule registration unit
16 Rule matching unit
17 Packet counting unit
18 Data collection unit
19 Storage unit
110 Statistical analysis unit
111 Display unit
112 Control unit.

The invention claimed is:

1. A traffic monitoring apparatus comprising:
a processor;
a memory storing a program to be executed by the processor, the program including instructions to:
  acquire one or more identifiers from a header of a received packet;
  convert a rule table into a predetermined format and register the rule table, wherein the rule table includes rules in which one or more rule elements are registered for each of the rules; and
  search for matching rules from the rule table to be matched with the one or more identifiers;
wherein the instructions to search for matching rules includes instructions to:
  output values indicating the matching rules to be matched with the one or more identifiers; and
  calculate a logical AND of the output values indicating the matching rules to be matched with the one or more identifiers; and
wherein the instructions to output values indicating the matching rules to be matched with the one or more identifiers includes instructions to:
  calculate hash values of the one or more identifiers;
  hold, in a hash table, values representing rules to be matched with identifiers for hash values identifying each of the rule elements;
  hold, in a wild card storage circuit, values representing wild card rules for which wild cards have been set, for each of the rule elements; and
  calculate a logical OR of values in the hash table corresponding to the hash values of the rule elements and corresponding values of corresponding rule elements in the wild card storage circuit.

2. The traffic monitoring apparatus according to claim 1, wherein the hash table is configured with:
a first table in which an address of a second table is registered for each of the hash values of the rule elements; and
the second table in which the values representing the rules to be matched with the one or more identifiers are registered for each address.

3. The traffic monitoring apparatus according to claim 1, wherein instructions to search for matching rules includes further instructions to:
calculate hash values for the rule elements;
group rule elements of the rule elements with a same hash value for each of the rule elements;
calculate values representing the rules to be matched with the one or more identifiers for each group of the rule elements;
calculate values representing the rules for which the wild cards have been set, for each of the rule elements; and
register the calculated values in the hash table and the wild card storage circuit.

4. The traffic monitoring apparatus according to claim 1, wherein the hash table holds, for each of the hash values of the rule elements, a bit sequence in which rules with described identifiers corresponding to the hash values of the rule elements are represented by 1 and other rules are represented by 0, and wherein the wild card storage circuit holds, for each of the rule elements, a bit sequence in which rules with wild cards set are represented by 1 and other rules are represented by 0.

5. A traffic monitoring method comprising:
converting a rule table into a predetermined format and registering the rule table, wherein the rule table includes rules in which one or more rule elements are registered for each of the rules
acquiring one or more identifiers from a header of a received packet; and
searching for matching rules to be matched with the one or more identifiers;
wherein the searching for the matching rules includes:
a step of outputting values representing the matching rules to be matched with the one or more identifiers, the step of outputting the values including:
calculating hash values of the one or more identifiers;
searching for a hash table that holds values representing rules to be matched with identifiers for hash values identifying each of the rule elements, using the hash values of the one or more identifiers as inputs; and
calculating, for each of the rule elements, a logical OR of wild card information constituted by a value output from the hash table and a value representing a rule for which a wild card has been set in a corresponding one of the rule elements; and
a step of calculating a logical AND of the logical OR calculated for each of the rule elements.

6. The traffic monitoring method according to claim 5, wherein the hash table is configured with:
a first table in which an address of a second table is registered for each of the hash values of the rule elements; and
the second table in which the values representing the rules to be matched with the one or more identifiers are registered for each address.

7. The traffic monitoring method according to claim 5, wherein the registering of the rule table includes:
calculating hash values for the rule elements;
grouping rule elements of the rule elements with a same hash value for each of the rule elements;
calculating values representing the rules to be matched with the identifiers for each group of the rule elements;
calculating values representing the rules for which the wild cards have been set, for each of the rule elements; and
registering the calculated values in the hash table and the wild card information.

8. The traffic monitoring method according to claim 5, wherein the hash table holds, for each of the hash values, a bit sequence in which rules with described identifiers corresponding to the hash values are represented by 1 and other rules are represented by 0, and the wild card information is a bit sequence in which for each of the rule elements, a bit sequence in which rules with wild cards set are represented by 1 and other rules are represented by 0.

* * * * *